US012562174B2

(12) United States Patent
Moradi Ashour et al.

(10) Patent No.: US 12,562,174 B2
(45) Date of Patent: Feb. 24, 2026

(54) NOISE SUPPRESSION LOGIC IN ERROR CONCEALMENT UNIT USING NOISE-TO-SIGNAL RATIO

(71) Applicant: Telefonaktiebolaget LM Ericsson (publ), Stockholm (SE)

(72) Inventors: Chamran Moradi Ashour, Stockholm (SE); Erik Norvell, Upplands Väsby (SE); Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 18/036,481

(22) PCT Filed: Nov. 24, 2021

(86) PCT No.: PCT/EP2021/082850

§ 371 (c)(1),
(2) Date: May 11, 2023

(87) PCT Pub. No.: WO2022/112343

PCT Pub. Date: Jun. 2, 2022

(65) Prior Publication Data

US 2023/0402043 A1 Dec. 14, 2023

Related U.S. Application Data

(60) Provisional application No. 63/118,678, filed on Nov. 26, 2020.

(51) Int. Cl.
*G10L 19/005* (2013.01)
*G10L 25/18* (2013.01)
(Continued)

(52) U.S. Cl.
CPC ............ *G10L 19/005* (2013.01); *G10L 25/18* (2013.01); *G10L 25/21* (2013.01); *G10L 25/69* (2013.01)

(58) Field of Classification Search
CPC .......... G10L 25/18; G10L 25/21; G10L 25/69
See application file for complete search history.

(56) References Cited

U.S. PATENT DOCUMENTS

| | | | | |
|---|---|---|---|---|
| 9,947,341 B1 * | 4/2018 | Marsh | G10L 25/18 |
| 2003/0009091 A1 * | 1/2003 | Edgar, Jr. | A61B 5/14551 600/323 |

(Continued)

FOREIGN PATENT DOCUMENTS

| | | | |
|---|---|---|---|
| EP | 2954517 A1 | 12/2015 |
| WO | 9962053 A1 | 12/1999 |

(Continued)

OTHER PUBLICATIONS

International Search Report and Written Opinion of the International Searching Authority, PCT/EP2021/082850, mailed Mar. 7, 2022, 13 pages.

(Continued)

*Primary Examiner* — Daniel C Washburn
*Assistant Examiner* — Paul J. Mueller
(74) *Attorney, Agent, or Firm* — Sage Patent Group

(57) ABSTRACT

A method and a decoder for generating concealment audio frame of an audio signal. The method includes performing a frequency domain analysis of a sequence of previously decoded audio signal to obtain a frequency spectrum and identifying peaks in the spectrum. The method further includes estimating a relative energy between the noise spectrum and the complete spectrum, determining an attenuation of the noise spectrum based on the relative energy, and applying the attenuation to the noise spectrum. The method includes applying an inverse transform to time domain on an error concealment spectrum, that includes the peaks and the attenuated noise spectrum.

16 Claims, 14 Drawing Sheets

(51) Int. Cl.

| | |
|---|---|
| ***G10L 25/21*** | (2013.01) |
| ***G10L 25/69*** | (2013.01) |

(56) References Cited

U.S. PATENT DOCUMENTS

| | | | | |
|---|---|---|---|---|
| 2004/0052384 | A1* | 3/2004 | Ashley | H04B 1/1027 381/94.1 |
| 2008/0159573 | A1* | 7/2008 | Dressler | H04R 25/505 381/317 |
| 2011/0046947 | A1* | 2/2011 | Vaillancourt | G10L 19/26 704/226 |
| 2014/0172141 | A1* | 6/2014 | Mangold | G10L 19/018 700/94 |
| 2017/0287494 | A1* | 10/2017 | Bruhn | G10L 25/45 |

FOREIGN PATENT DOCUMENTS

| | | | |
|---|---|---|---|
| WO | 2014123469 | A1 | 8/2014 |
| WO | 2014123470 | A1 | 8/2014 |
| WO | 2014123471 | A1 | 8/2014 |

OTHER PUBLICATIONS

3GPP TS 26.447 v12.2.0 (Mar. 2015); 3rd Generation Partnership Project; Technical Specification Group Services and System Aspects; Codec for Enhanced Voice Services (EVS); Error Concealment of Lost Packets (Release 12); 80 pages.

Lecomte, Jérémie et al., "Packet-Loss Concealment Technology Advances in EVS," 2015 IEEE International Conference on Acoustics, Speech and Signal Processing (ICASSP), South Brisbane, QLD, Australia, 2015, pp. 5708-5712.

* cited by examiner

NOISE SUPPRESSION LOGIC IN ERROR CONCEALMENT UNIT USING NOISE-TO-SIGNAL RATIO

CROSS REFERENCE TO RELATED APPLICATIONS

This application is a 35 U.S.C. § 371 national stage application of PCT International Application No. PCT/EP2021/082850 filed on Nov. 24, 2021, which in turn claims domestic priority to U.S. Provisional Patent Application No. 63/118,678, filed on Nov. 26, 2020, the disclosures and content of which are incorporated by reference herein in their entirety.

TECHNICAL FIELD

The present disclosure relates generally to communications, and more particularly to encoder/decoder methods and related devices and nodes supporting encoder/decoder operations.

BACKGROUND

Transmission of speech/audio over modern communications channels/networks is mainly done in the digital domain using a speech/audio codec. Using the speech/audio codec may involve taking the analog signal and digitalizing it using sampling and analog to digital (A/D) converter 100 to obtain digital samples. These digital samples may be further grouped into frames that contain samples from a consecutive period of 10-40 ms depending on the application. These frames may then be processed (e.g., encoded) using a compression algorithm, which reduces the number of bits that needs to be transmitted and which may still achieve as high quality as possible. The resulting encoded bit stream is then transmitted as data packets over the digital network 104 to a receiver. In the receiver, the process is reversed. The data packets may first be decoded to recreate the frame with digital samples which may then be input to a digital to analog (D/A) converter 108 to recreate the approximation of the input analog signal at the receiver. FIG. 1 provides an example of a block diagram of an audio transfer using audio encoder 102 and decoder 106 over a network 104, such as a digital network, using the above-described approach.

The transmitted data packets may be lost or corrupted due to poor connection, network congestion, etc. To overcome the problem of transmission errors and lost packages, telecommunication services make use of Packet Loss Concealment (PLC) techniques. The missing information of lost or corrupt data packets in the receiver side may be substituted by the decoder with a synthetic signal to conceal the lost or corrupt data packet. There are many different terms used for the packet loss concealment techniques, including Frame Error Concealment (FEC), Frame Loss Concealment (FLC), and Error Concealment Unit (ECU). Some embodiments of PLC techniques are often tied closely to the decoder, where the internal states can be used to produce a signal continuation or extrapolation to cover the packet loss. For a multimode codec having several operating modes for different signal types, there are often several PLC technologies that can be implemented to handle the concealment of the lost or corrupt data packet.

For linear prediction (LP) based speech coding modes, a technique that may be used is based on adjustment of glottal pulse positions using estimated end-of-frame pitch information and replication of pitch cycle of the previous frame. The gain of the long-term predictor (LTP) converges to zero with the speed depending on the number of consecutive lost frames and the stability of the last good frame. Frequency domain (FD) based coding modes are typically designed to handle general or complex signals such as music. For such signals, different techniques may be used depending on the characteristics of the last received frame. The analysis may include the number of detected tonal components and periodicity of the signal. If the frame loss occurs during a highly periodic signal such as active speech or single instrumental music, a time domain PLC similar to the LP based PLC may be suitable for implementation. In this case, the FD PLC may mimic an LP decoder by estimating LP parameters and an excitation signal based on the last received frame. In case the lost frame occurs during a non-periodic or noise-like signal, the last received frame may be repeated in spectral domain where the coefficients are multiplied to a random sign signal to reduce the metallic sound of a repeated signal. For a stationary tonal signal, it has been found advantageous in some embodiments to use an approach based on prediction and extrapolation of the detected tonal components.

One concealment method operating in the frequency domain is the Phase ECU, disclosed in WO2014123471A1. The Phase ECU can be implemented as a stand-alone tool operating on a buffer of the previously decoded time domain signal. Thus, it can be used in different audio coding modes including mono, stereo or multichannel audio coding modes. Its framework is based on a sinusoidal analysis and synthesis paradigm. FIG. 4 illustrates a flow chart of the steps taken through the reconstruction of signal. In this technique, the sinusoid components of the last good frame (i.e., a received error free frame) are extracted, and phase shifted. When a frame is lost, the sinusoid frequencies are obtained in DFT (Discrete Fourier Transform) domain from the past decoded synthesis 400. First the corresponding frequency bins are identified by finding the peaks 404 of the magnitude spectrum plane 402. Then, fractional frequencies of the peaks are estimated 406 using peak frequency bins. The peak frequency bins and corresponding fractional frequencies may be stored for use in creating a substitute for a lost frame. The frequency bins of the complex DFT spectrum corresponding to the peaks along with the neighbors are phase shifted 408 using fractional frequencies. For the remaining frequency bins of the frame, which can be called noise spectrum, the magnitude of the past synthesis is retained while the phase may be randomized 410. The signal, which is composed from phase randomized noise spectrum and phase adjusted peaks, is then transformed to time domain using inverse DFT 412. The burst error may also be handled such that the estimated signal can be smoothly muted by converging it to zero. FIG. 2 is an example of sinusoid components 200, i.e. peaks, along with noise spectrum 202.

FIG. 3 represents a block diagram of a decoder 300 including Phase ECU solution to compensate the lost packets. A bit stream 302 is input to a stream decoder 306 that outputs a decoded signal to a digital to analog converted 310 when the BFI (Bad Frame Indicator) 304 does not indicate that the current frame is lost or corrupted, i.e. BFI=0. When the BFI 304 indicates that the current frame is lost or corrupted, i.e. BFI=1, Phase ECU 308 steps are activated. These steps are illustrated in FIG. 5 and explained below.

In case an encoded audio frame is correctly received, the decoder produces a synthesized audio frame to be forwarded to the digital to analog converter (DAC) for playback. In addition, it is input into a buffer 510 that serves as a memory of the past decoded frames in case of frame loss. In case a frame is lost, the following steps are taken. The past decoded analysis frame may be written $$x(n)$$

where n=0, 1, 2, . . . , N denotes the sample number in analysis frame m and N is the length of the analysis frame. Note that the analysis frame may be longer than the lost frame, such that N is larger than the length of the audio frame to be concealed. First, an analysis window is typically applied.

$$x_{win}(n)=x(n)w(n)$$

where w(n) is a windowing function. The windowing function reduces the impact of the edges of the short-time DFT. It can further suppress the side-lobes of the transformed spectrum, while sacrificing a little bit of the frequency resolution. A suitable window may e.g. be a Hanning window, a Hamming window, or a Hamming-Rectangular (Hammrect) window, which has the rise and decay of a Hamming window and a flat segment in the middle.

The frame $x_{win}(n)$ is transformed to DFT domain frequency spectrum X(k), where k represents frequency bin index, in block 520 in accordance with $$X(k) = \sum_{n=0}^{N-1} x_{win}(n) e^{-\frac{j2\pi kn}{N}}.$$

In some embodiments, the decoder already reconstructs a DFT spectrum X(k) during the decoding process. In such cases, the DFT transform block 520 is not needed and the DFT spectrum from the last decoded frame could be stored and retrieved from memory when frame loss occurs.

The magnitude representation of X(k) is then computed in block 530 and is to be used as an input of peak finder algorithm in block 540.

$$|X(k)|=\sqrt{\mathrm{Re}\{X(k)\}^2+\mathrm{Im}\{X(k)\}^2}$$

where Re{X(k)} and Im{X(k)} represent real part and imaginary part of X(k) respectively. It can be noted that for a real-valued signal the DFT spectrum is symmetric, where the second half is the mirrored complex conjugate of the first half. For this reason the evaluation only needs to be done for k=0, 1, 2, . . . , N/2.

In block 540, different algorithms may be used to find peaks and corresponding position in the spectrum.

$$k_i=\mathrm{PeakFinder}(|X(k)|)$$

where $k_i$ is a peak position represented as a frequency bin number, $N_{peaks}$ denotes the number of peaks and i=1, 2, . . . , $N_{peaks}$ is a peak index of the spectrum. The integer index provides a coarse frequency resolution which is determined by the inverse of the length of the analysis window. For a more accurate frequency estimation an interpolation method in block 550 is applied. In short-time DFT analysis, a tonal or sinusoidal component in the analysis is typically spread across several frequency bins. For this reason, each peak is represented with a range of neighboring bins around the peak index. This group of bins G(i) may be formed by including $N_{near}$ neighboring bins on each side of the peak index $k_i$. An example of a set of peaks and neighboring bins is illustrated in FIG. 14A.

$$G(i)=\{k_i-N_{near}, \ldots, k_i, \ldots, k_i+N_{near}\}$$

It should be noted that the groups may need to be adjusted such that the group is entirely within the limits of the spectrum. For peak indices closer than $N_{near}/2$, the groups are adjusted such that the bins are assigned to the closest peak and that no groups are overlapping.

After estimation the fractional frequency of the peaks, an estimation of the continued sinusoidal component is generated by applying a phase shift in block 560 where the phase shift corresponds to the phase evolution since the start of the analysis frame until the starting point of the ECU frame to be generated. The same phase shift is applied within each group of bins G(i) representing peak i.

The remaining bins, not part of any of the groups G(m,i), constitute the noise component of the spectrum, also referred to as the noise spectrum:

$$X_{noise}(k)=X(k), k\in G(i), i=1,2, \ldots, N_{peaks}$$

An example of an isolated noise spectrum is illustrated in FIG. 14B. The phases of the noise spectrum coefficients are randomized 570. The signal, which is composed from phase randomized noise spectrum and phase adjusted peaks, is then transformed to time domain using inverse DFT 580 for rendering an ECU frame in time domain. If the DFT analysis was done on a windowed signal, it may be desirable to apply an inverse windowing at this stage. The reconstructed time domain signal may be further processed to provide a seamless continuation when combined with the previously decoded synthesis and future decoded frames. If the decoder operates in a Modified Discrete Cosine Transform (MDCT) domain or in general in any Modulated Lapped Transform (MLT) based decoder, an artificial time domain aliasing (TDA) operation may be applied. In that case the frame has the same format as output by the MDCT decoder stage and fits directly into the MDCT synthesis and overlap-add operation. It could also be advantageous to exclude the TDA, since the generated time domain aliasing may not be aligned to cancel the TDA of the previous frame. In such a case, a windowing and overlap-add strategy may be applied without the TDA operation.

SUMMARY

In cases when the background noise does not carry enough energy yet is audible, the noise spectrum existing in the reconstructed signal may have a negative impact on overall quality by adding undesired artifact(s) to the output of the audio codec. In these cases, the noise spectrum preferably shall be zeroed or attenuated. However, in some other cases where the noise spectrum carries significant amount of energy of the corresponding signal, zeroing or attenuating the noise spectrum may cause a sudden drop of energy to appear in the reconstructed signal which, in turn, may have a negative impact on the overall quality.

The different impact of noise spectrum on the overall quality, necessitates the creation of a mechanism which should zero or attenuate the noise spectrum when needed and keep it untouched otherwise.

Accordingly, a decision-making method and apparatus based on whether or not the noise spectrum will be zeroed or attenuated or remain untouched is provided. The decision-making works based on noise-to-signal ratio (NSR) of the reconstructed signal.

According to a first aspect, a method of generating concealment audio frame of an audio signal in a decoding device is provided. The method comprises performing a frequency domain analysis of a sequence of previously decoded audio signal to obtain a frequency spectrum and identifying tonal components in the frequency spectrum by identifying peaks in the spectrum. A phase adjustment is applied on the identified peaks by adjusting the phase of the peak and neighboring bins. A random phase adjustment is applied to a noise spectrum which comprises spectral bins that do not belong to the peaks and their neighboring bins. A relative energy between the noise spectrum and the complete spectrum is estimated, an attenuation of the noise spectrum is determined based on the relative energy and the attenuation is applied to the noise spectrum. An inverse transform to time domain is applied on an error concealment spectrum, which is comprised of the phase adjusted peaks and the attenuated noise spectrum.

According to a second aspect, a decoder or generating concealment audio frame of an audio signal in a decoding device is provided. The decoder comprises processing circuitry and memory coupled with the processing circuitry, wherein the memory includes instructions that when executed by the processing circuitry causes the decoder to perform operations comprising performing a frequency domain analysis of a sequence of previously decoded audio signal to obtain a frequency spectrum, identifying tonal components in the frequency spectrum by identifying peaks in the spectrum. The memory includes instructions that when executed by the processing circuitry causes the decoder to perform operations comprising applying a phase adjustment on the identified peaks by adjusting the phase of the peak and neighboring bins and applying a random phase adjustment to a noise spectrum which comprises spectral bins that do not belong to the peaks and their neighboring bins. The memory includes instructions that when executed by the processing circuitry causes the decoder to perform operations comprising estimating a relative energy between the noise spectrum and the complete spectrum, determining an attenuation of the noise spectrum based on the relative energy, applying the attenuation to the noise spectrum; and applying an inverse transform to time domain on an error concealment spectrum, which is comprised of the phase adjusted peaks and the attenuated noise spectrum.

According to a third aspect, a decoder is provided. The decoder is adapted to perform operations comprising performing a frequency domain analysis of a sequence of previously decoded audio signal to obtain a frequency spectrum, identifying tonal components in the frequency spectrum by identifying peaks in the spectrum. The decoder is adapted to apply a phase adjustment on the identified peaks by adjusting the phase of the peak and neighboring bins and apply a random phase adjustment to a noise spectrum which comprises spectral bins that do not belong to the peaks and their neighboring bins. The decoder is adapted to estimate a relative energy between the noise spectrum and the complete spectrum, determine an attenuation of the noise spectrum based on the relative energy, apply the attenuation to the noise spectrum; and apply an inverse transform to time domain on an error concealment spectrum, which is comprised of the phase adjusted peaks and the attenuated noise spectrum.

According to a fourth aspect, a computer program is provided. The computer program comprises program code to be executed by processing circuitry of a decoder, whereby execution of the program code causes the decoder to perform operations according to the first aspect.

According to a fifth aspect, a computer program product is provided. The computer program product comprises a non-transitory storage medium including program code to be executed by processing circuitry of a decoder, whereby execution of the program code causes the decoder to perform operations according to the first aspect.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 6:
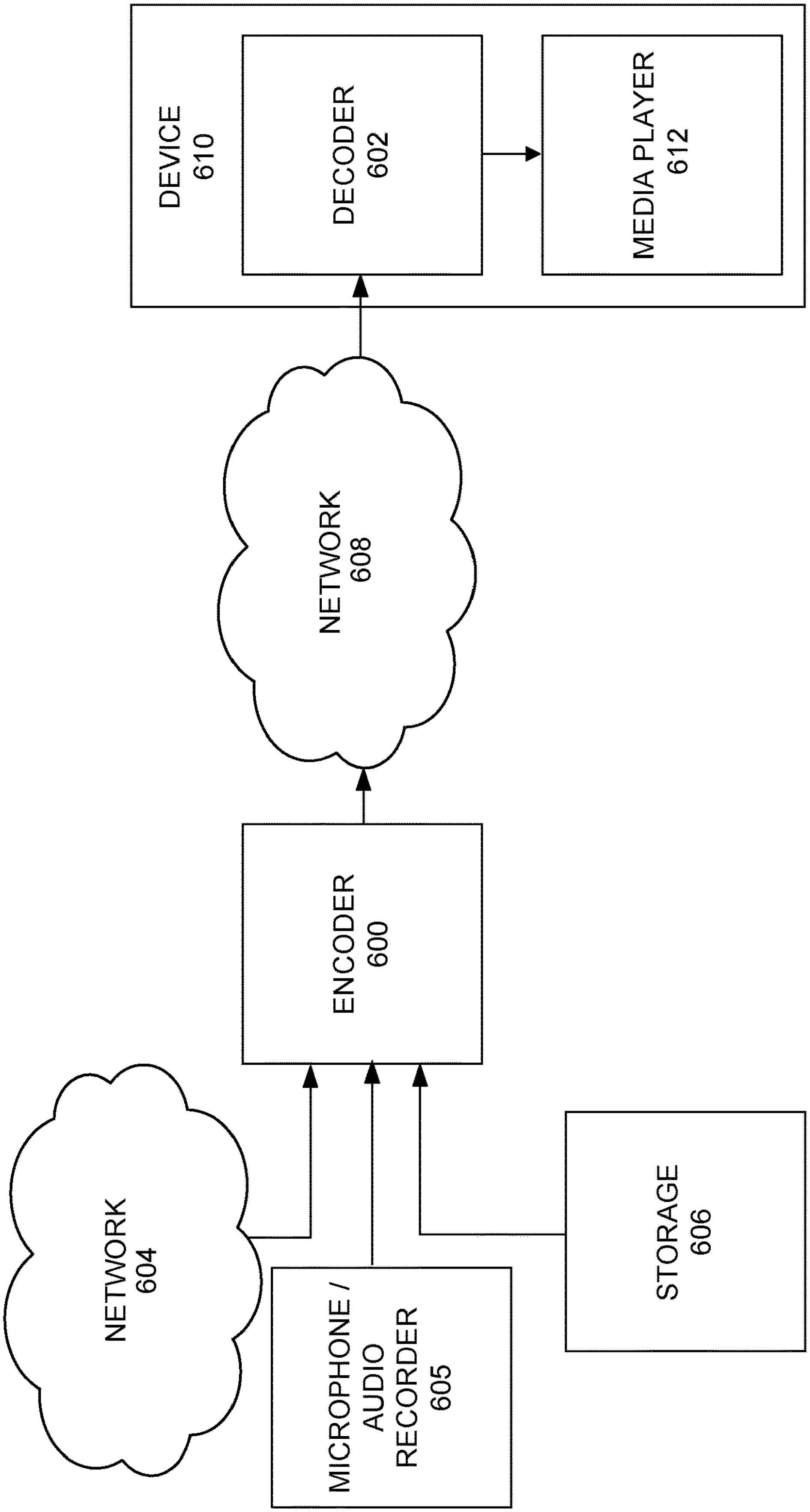
FIG. 6 is an illustration of an operating environment for the encoder and decoder according to some embodiments.

Prior to describing the embodiments in further detail, FIG. 6 illustrates an example of an operating environment of an encoder 600 that may be used to encode bitstreams and a decoder 602 that may be used to decode bitstreams as described herein. The encoder 600 receives audio from network 604, from microphone/audio recorder 605, and/or from storage 606 and encodes the audio into bitstreams as described below and transmits the encoded audio to decoder 602 via network 608. Storage device 606 may be part of a storage depository of multi-channel audio signals such as a storage repository of a store or a streaming audio service, a separate storage component, a component of a mobile device, etc. The decoder 602 may be part of a device 610 having a media player 612. The device 610 may be a mobile device, a set-top device, a desktop computer, and the like.

Figure 7:
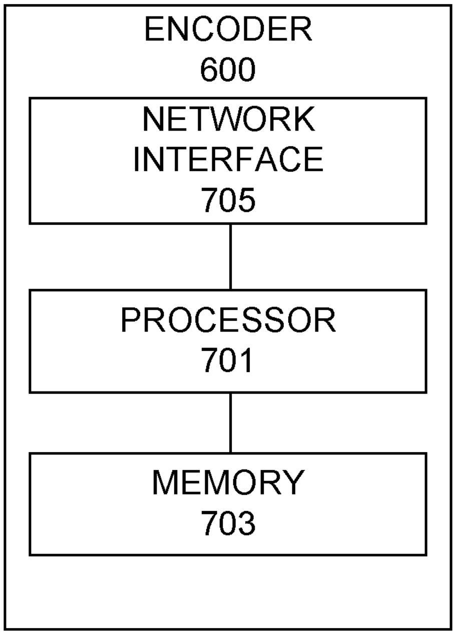
FIG. 7 is a block diagram illustrating an encoder according to some embodiments of inventive concepts.

FIG. 7 is a block diagram illustrating elements of encoder 600 configured to encode audio frames according to some embodiments of inventive concepts. As shown, encoder 600 may include a network interface circuitry 705 (also referred to as a network interface) configured to provide communications with other devices/entities/functions/etc. The encoder 600 may also include processing circuitry 701 (also referred to as a processor and processor circuitry) coupled to the network interface circuitry 705, and a memory circuitry 703 (also referred to as memory) coupled to the processing circuit. The memory circuitry 703 may include computer readable program code that when executed by the processing circuitry 701 causes the processing circuit to perform operations according to embodiments disclosed herein.

According to other embodiments, processing circuitry 701 may be defined to include memory so that a separate memory circuit is not required. As discussed herein, operations of the encoder 600 may be performed by processing circuitry 701 and/or network interface 705. For example, processing circuitry 701 may control network interface 705 to transmit communications to decoder 602 and/or to receive communications through network interface 605 from one or more other network nodes/entities/servers such as other encoder nodes, depository servers, etc. Moreover, modules may be stored in memory 703, and these modules may provide instructions so that when instructions of a module are executed by processing circuitry 701, processing circuitry 701 performs respective operations.

Figure 8:
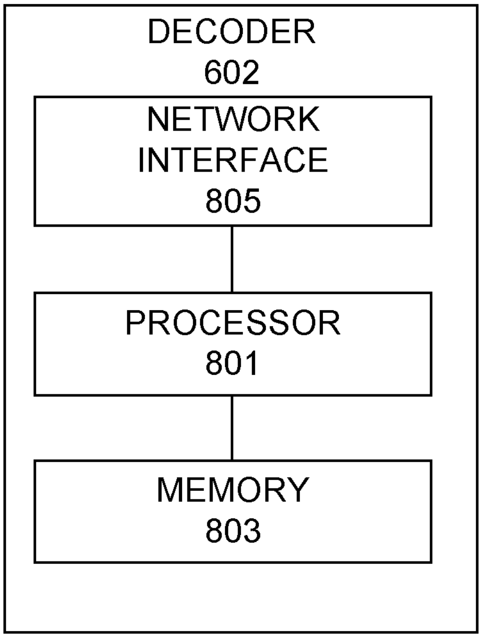
FIG. 8 is a block diagram illustrating a decoder according to some embodiments of inventive concepts.

FIG. 8 is a block diagram illustrating elements of decoder 602 configured to decode audio frames according to some embodiments of inventive concepts. As shown, decoder 602 may include a network interface circuitry 805 (also referred to as a network interface) configured to provide communications with other devices/entities/functions/etc. The decoder 602 may also include a processing circuitry 801 (also referred to as a processor or processor circuitry) coupled to the network interface circuit 805, and a memory circuitry 803 (also referred to as memory) coupled to the processing circuit. The memory circuitry 803 may include computer readable program code that when executed by the processing circuitry 801 causes the processing circuit to perform operations according to embodiments disclosed herein.

According to other embodiments, processing circuitry 801 may be defined to include memory so that a separate memory circuit is not required. As discussed herein, operations of the decoder 602 may be performed by processor 801 and/or network interface 805. For example, processing circuitry 801 may control network interface circuitry 805 to receive communications from encoder 600. Moreover, modules may be stored in memory 803, and these modules may provide instructions so that when instructions of a module are executed by processing circuitry 801, processing circuitry 801 performs respective operations.

As previously indicated, when background noise does not carry enough energy yet is audible, the noise spectrum existing in the reconstructed signal may have a negative impact on overall quality with the added noise spectrum. In other scenarios where the noise spectrum carries a significant amount of energy of the corresponding signal, zeroing or attenuating the noise spectrum may cause a sudden drop of energy to appear in the reconstructed signal which, in turn, may have a negative impact on the overall quality of the perceived signal.

According to various embodiments of inventive concepts, noise spectrum will be attenuated or zeroed when it is harmful and remain untouched when the noise spectrum is needed.

One aspect of the various embodiments of inventive concepts is that the available magnitude representation of the reconstructed signal is used, which results in a very low complexity to control the noise spectrum in the reconstructed signal.

The inventive concepts described may also be used with subframe notation. In other words, the subframes may form groups of frames that have the same window shape as described herein and subframes do not need to be part of a larger frame.

Figure 9:
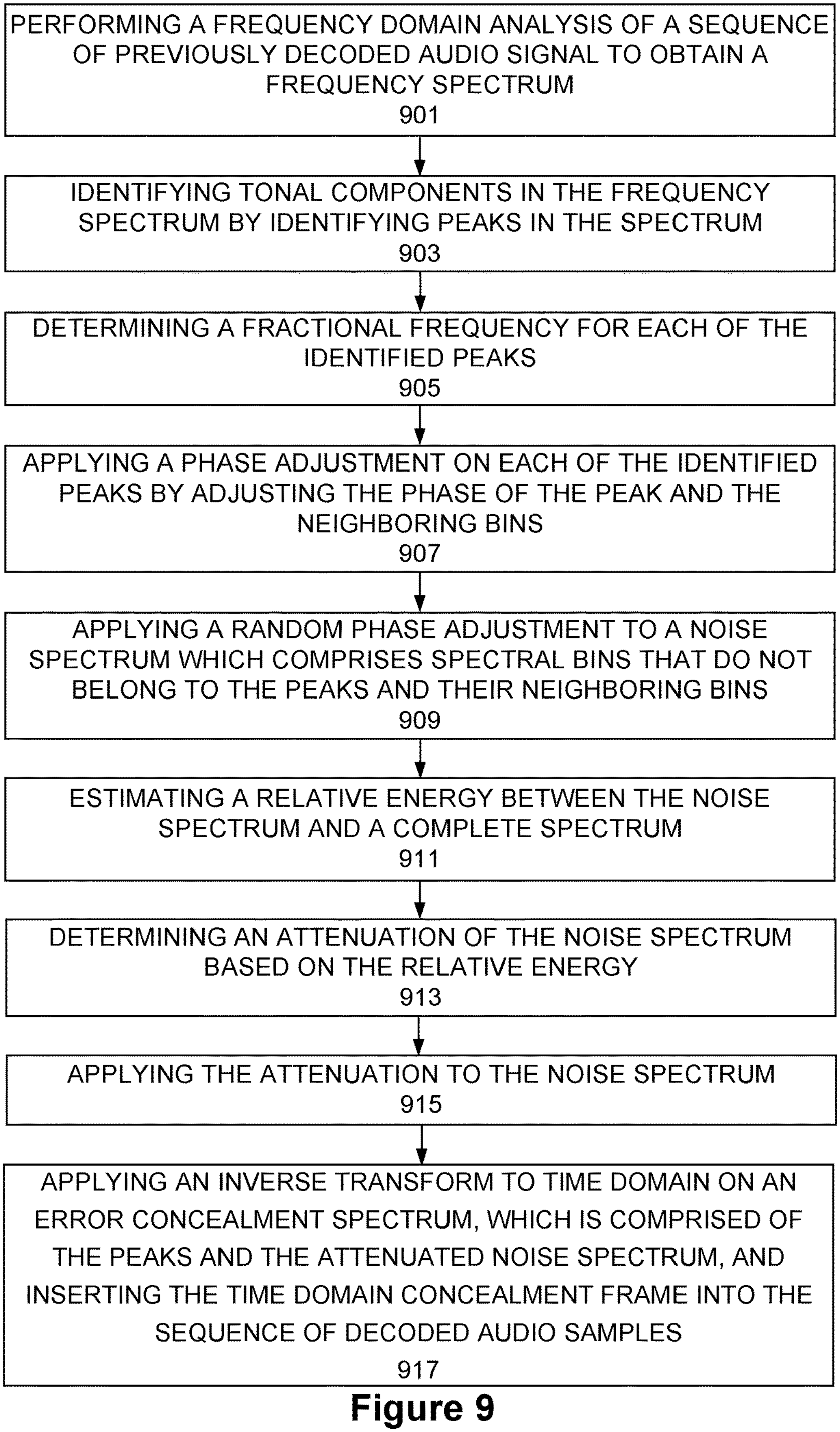
FIGS. 9-13 are flow chart illustrating operations of a decoder according to some embodiments of inventive concepts.

Operations of the decoder 602 (implemented using the structure of the block diagram of FIG. 8) will now be discussed with reference to the flow chart of FIG. 9 according to some embodiments of inventive concepts. For example, modules may be stored in memory 803 of FIG. 8, and these modules may provide instructions so that when the instructions of a module are executed by respective decoder processing circuitry 801, processing circuitry 801 performs respective operations of the flow chart.

As previously indicated, the past decoded analysis frame may be written $$x(n)$$

where n=0, 1, 2, . . . , N denotes the sample number in frame m and N is the length of the frame. In block 901, the processing circuitry 801 performs a frequency domain analysis of the previously decoded audio signal to obtain a frequency spectrum. A windowing may be applied to obtain a windowed sequence.

$$x_{win}(n)=x(n)w(n)$$

The frequency domain analysis may be a discrete Fourier transform in accordance with $$X(k)=\sum_{n=0}^{N-1} x_{win}(n)e^{-\frac{j2\pi kn}{N}}$$

In block 903, the processing circuitry 801 identifies tonal components in the frequency spectrum by identifying peaks in the frequency spectrum. For example, the magnitude representation of X(k) is determined in accordance with $$|X(k)|=\sqrt{\mathrm{Re}\{X(k)\}^2+\mathrm{Im}\{X(k)\}^2}$$

where Re{X(k)} and Im{X(k)} represent the real part and the imaginary part of X(k) respectively. Various algorithms may be used to find peaks and corresponding position of the peaks in the frequency spectrum, rendering peak locations at frequency bins $k_i$, where i is a peak index.

In block 905, the processing circuitry 801 determines (e.g., finds) a fractional frequency for each of the identified peaks. For example the peak detector algorithm used may detect peak frequencies on a fractional frequency scale. A set of peaks $$F=\{f_i\}, i=1,2, \ldots N_{peaks}$$

may be detected which are represented by their estimated fractional frequency $f_i$ and where $N_{peaks}$ is the number of detected peaks. The fractional frequency may be expressed as a fractional number of DFT bins, such that e.g. the Nyquist frequency is found at f=N/2. Each peak may be associated with a number of frequency bins representing the peak. The frequency bin $k_i$ represents the frequency on an integer scale while $f_i$ represents the peak position on a fractional scale:

$$\begin{cases} k_i \\ f_i \\ G(i) = \{k_i - N_{near}, \ldots, k_i, \ldots, k_i + N_{near}\} \end{cases}$$

where $k_i$ is the integer frequency and G (i) is the group of bins representing the peak at frequency $f_i$. The number $N_{near}$ is a tuning constant that may be determined when designing the system. A larger $N_{near}$ provides higher accuracy in each peak representation, but also introduces a larger distance between peaks that may be modeled. A suitable value for $N_{near}$ may be in the range [1 . . . 6].

In block 907, the processing circuitry 801 applies a phase adjustment on each of the identified peaks by adjusting the phase of the peak and the neighboring bins. In block 909, the processing circuitry 801 applies a random phase adjustment to a noise spectrum which comprises spectral bins that do not belong to the peaks and their neighboring bins. In other words, a random phase is applied to the remaining bins, which are not occupied by the peak bins $G_i$, and which are referred to as the noise spectrum or the noise component of the spectrum. These bins may be populated using the coefficients of the stored spectrum with a random phase applied. The remaining bins may also be populated with spectral coefficients that retain a desired property of the signal, e.g. correlation with a second channel in a multichannel decoder system.

In block 911, the processing circuitry 801 estimates a relative energy between the noise spectrum and the complete spectrum. This may occur after the identification of the peaks, the fractional peak frequencies, the peak groups G(m,i) and the remaining noise spectrum $X_{noise}$(k). An analysis of the relative energy of the noise spectrum may be done using a noise-to-signal ratio (NSR) in accordance with:

$$NSR = \frac{E_{X_{noise}}}{E_X}$$

$$E_X = \sum_{k=0}^{N-1} |X(k)|^2$$

$$E_{X_{noise}} = \sum_{k \notin G(i)} |X(k)|^2$$

where $E_X$ is the energy of the complete spectrum, $E_{X_{noise}}$ is the energy of the noise spectrum, N is a number of samples in the analysis window, and G(i) is the set of bins of the peak and neighboring bins. Note that the NSR will be in the range [0,1]. Note that due to the symmetry of the DFT spectrum, and since a ratio of energies is being compared, the mirrored negative frequencies at $$\frac{N}{2} + 1, \ldots, N - 1$$

may be omitted in the energy calculation. To correctly compute the absolute energy, the entire spectrum would have to be included.

In block 913, the processing circuitry 801 determines an attenuation of the noise spectrum based on the relative energy. In some embodiments of inventive concepts, a noise attenuation factor, which is later applied on the noise spectrum, is obtained using NSR and a threshold $NSR_{thr}$. In an embodiment, $a_{noise}$ is set to zero when the NSR is below the threshold $NSR_{thr}$ and set to one otherwise. A suitable value for $NSR_{thr}$ may be $NSR_{thr}$=0.175 in some embodiments of inventive concepts or in the range $NSR_{thr} \in (0,0.5]$ in other embodiments of inventive concepts.

$$a_{noise} = \begin{cases} 0, & NSR < NSR_{thr} \\ 1, & NSR \geq NSR_{thr} \end{cases}$$

The attenuation of the noise spectrum is then formed by the processing circuitry 801 applying the noise attenuation factor on the noise spectrum in block 915. For example, the attenuation of the noise spectrum may be formed in accordance with $$X_{noise,att}(k) = a_{noise} \cdot X_{noise}(k)$$

Note that a signal-to-noise ratio could also have been used to form the decision. In block 917, the processing circuitry 801 applies an inverse transform to time domain on an error concealment spectrum, which is comprised of the peaks and the attenuated noise spectrum, and inserts the time domain concealment frame into the sequence of decoded audio samples. Thus, along with the phase adjusted peaks, the attenuated noise spectrum $X_{noise,att}$(k) is then transformed to time domain by an inverse DFT step. The time domain ECU frame may be further processed with an optional TDA step and appropriate windowing and overlap add operations in order to fit into the sequence of decoded audio samples generated by the decoder 602. In some embodiments of inventive concepts, the time domain ECU frame is adapted using a time domain aliasing operation to fit into a Modulated Lapped Transform (MLT) based decoder.

In another embodiment of inventive concepts, the noise attenuation factor $a_{noise}$ could lay in the range $a_{noise} \in [0,1]$. The noise attenuation factor could be formed by performing a linear mapping of the NSR to a noise attenuation factor using a piece-wise linear function, e.g.

$$a_{noise} = \begin{cases} 1, & NSR_{hi} < NSR \\ \frac{(NSR - NSR_{lo})}{NSR_{hi} - NSR_{lo}}, & NSR_{lo} \leq NSR \leq NSR_{hi} \\ 0, & NSR < NSR_{lo} \end{cases}$$

where $NSR_{lo}$ is a constant in the range $NSR_{lo} \in (0,0.5]$ and $NSR_{hi}$ is a constant in the range $NSR_{hi} \in (NSR_{lo},1)$.

In a further embodiment of inventive concepts, the noise attenuation factor $a_{noise}$ may depend only on NSR. For example, $a_{noise}$ can be determined in accordance with $$a_{noise} = \min(1, c \cdot NSR)$$

where c is a constant in the range $c \in (0,1]$. In general, an attenuation factor may be formed as a function of the analyzed spectrum X(k) and the set of peaks Z.

$$a_{noise} = f(X(k), Z), Z = \{z_i\}, i = 1, 2, \ldots, N_{peaks}$$

Figure 1:
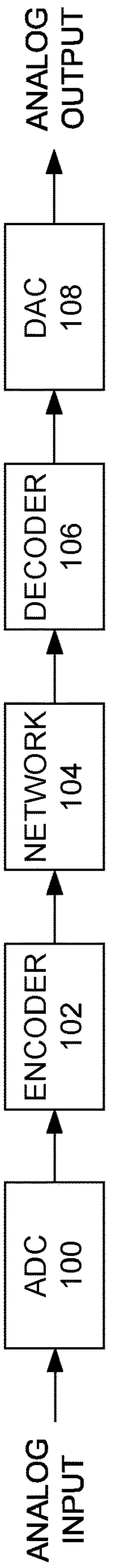
FIG. 1 is a block diagram illustrating an example of an audio transfer using an audio encoder and a decoder over a network.
Figure 2:
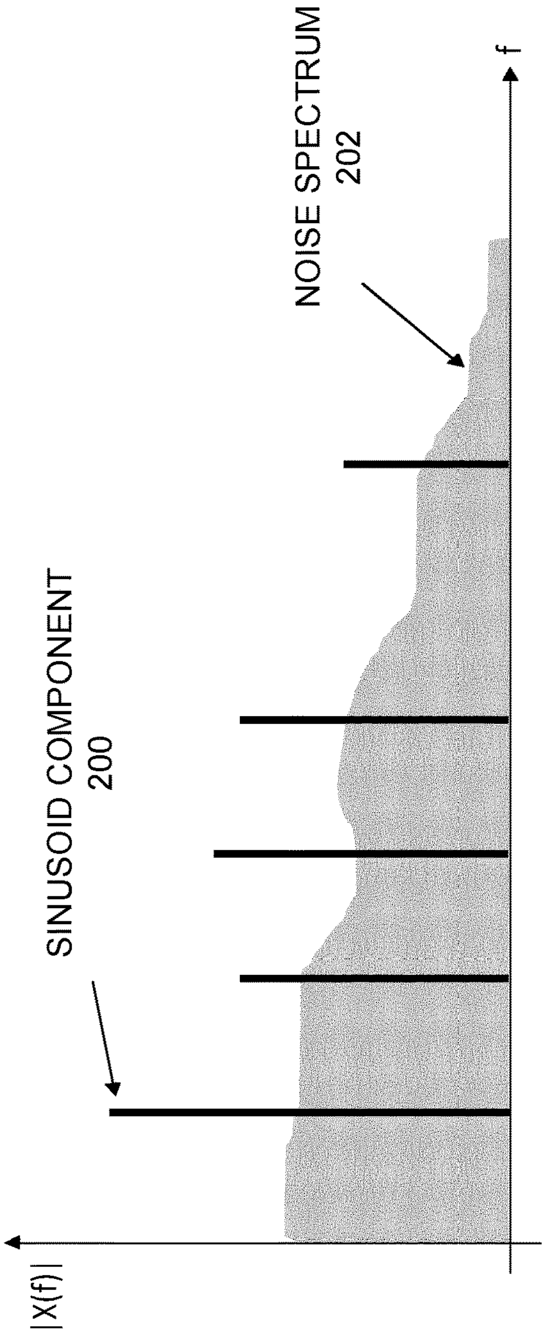
FIG. 2 illustrates an example of sinusoid components along with noise spectrum of a signal.
Figure 3:
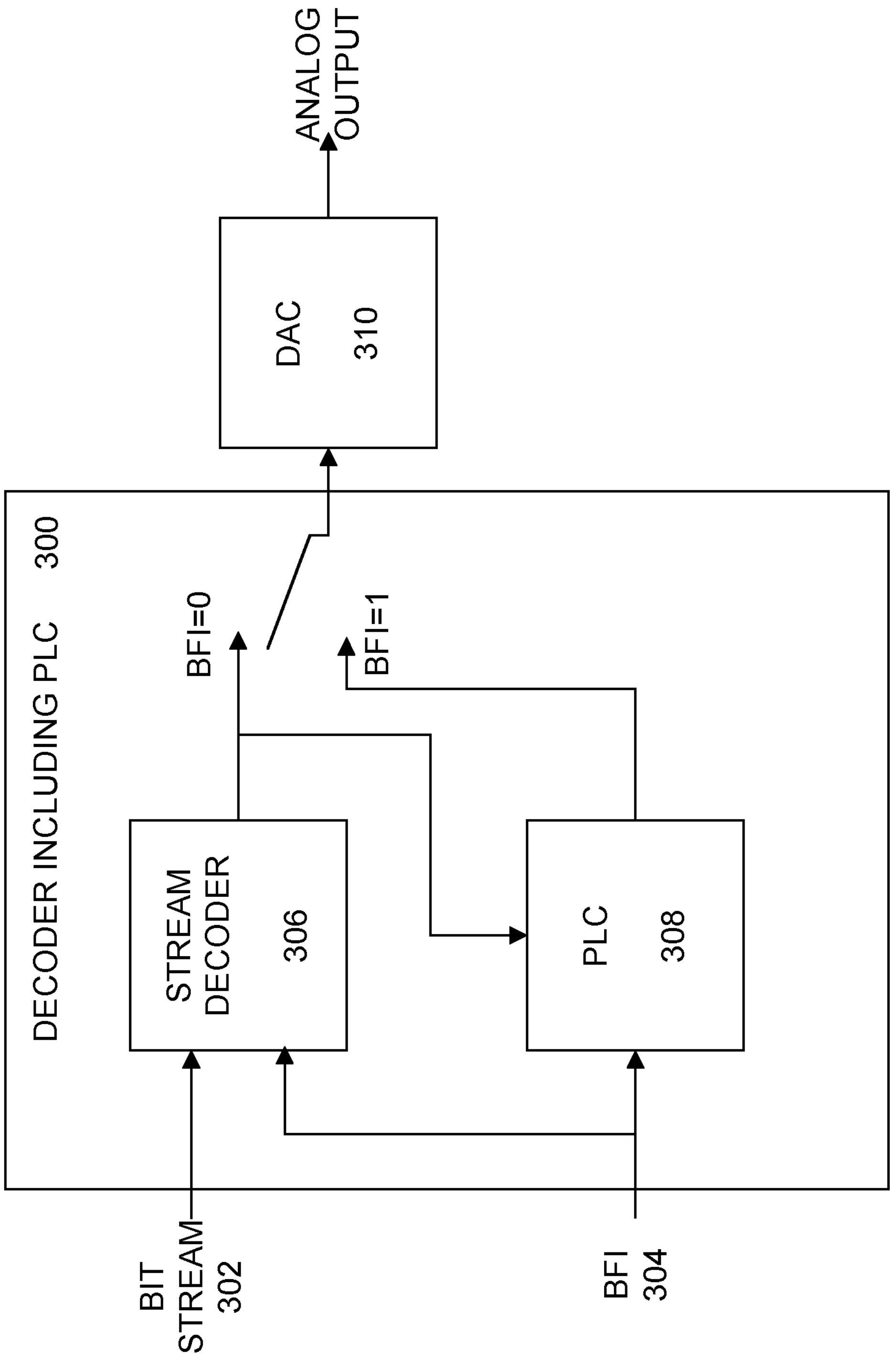
FIG. 3 is a block diagram illustrating a Phase ECU decoder to compensate for lost packets.
Figure 4:
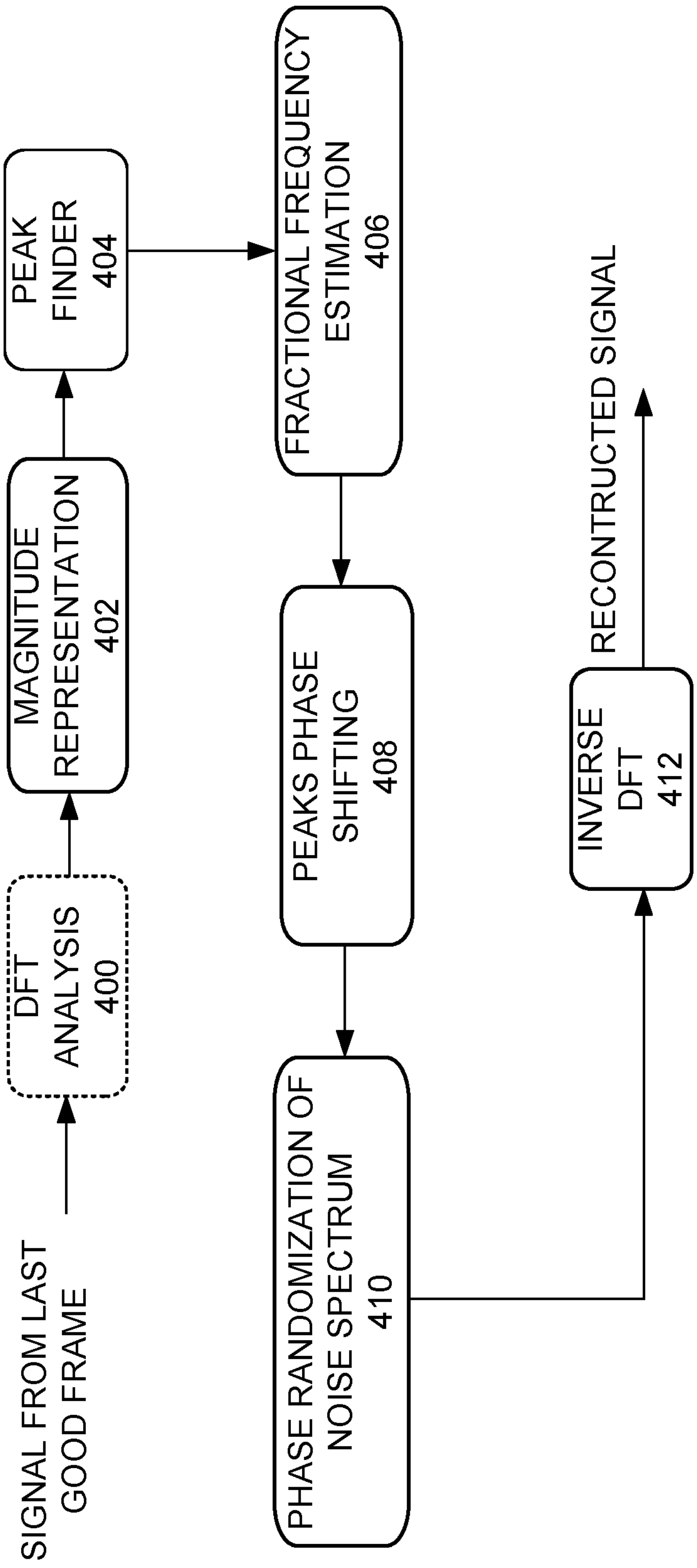
FIGS. 4 and 5 are flow charts illustrating operations of the Phase ECU decoder of FIG. 3.
Figure 10:
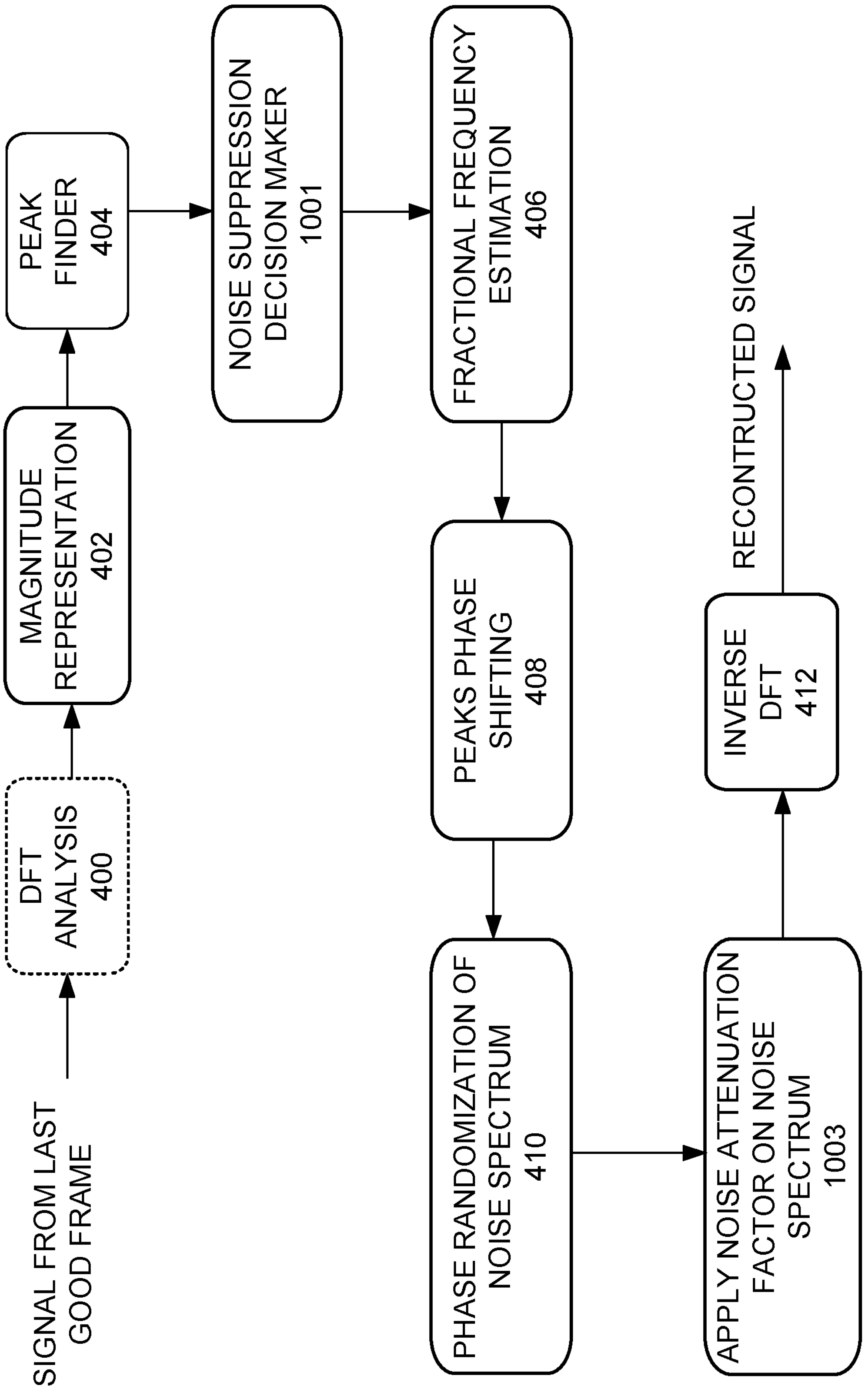

FIG. 10 illustrates how the inventive concepts of the noise attenuation can be integrated with the phase ECU block diagram of FIG. 4. The noise suppression decision maker block 1001 determines whether or not the noise suppression attenuation should be applied. While the noise suppression decision maker block 1001 is shown between the peak finder and the fractional decision estimation, the noise suppression block 1001 may be performed in other places of the phase ECU block diagram. The application of the noise attenuation factor on the noise spectrum block 1003 may be applied after the phase randomization of noise spectrum block, but it may also be applied before the phase randomization.

Figure 5:
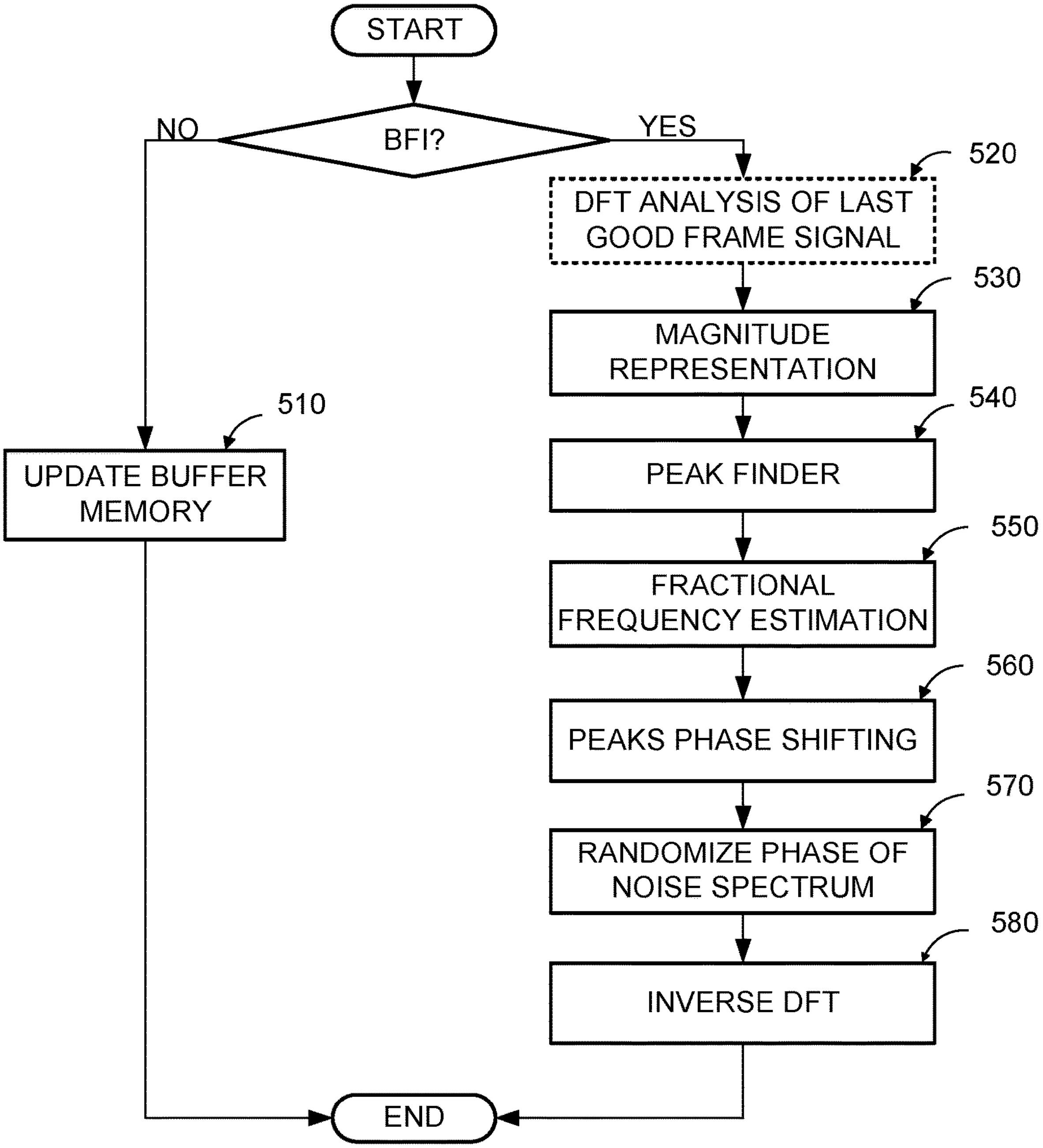
Figure 11:
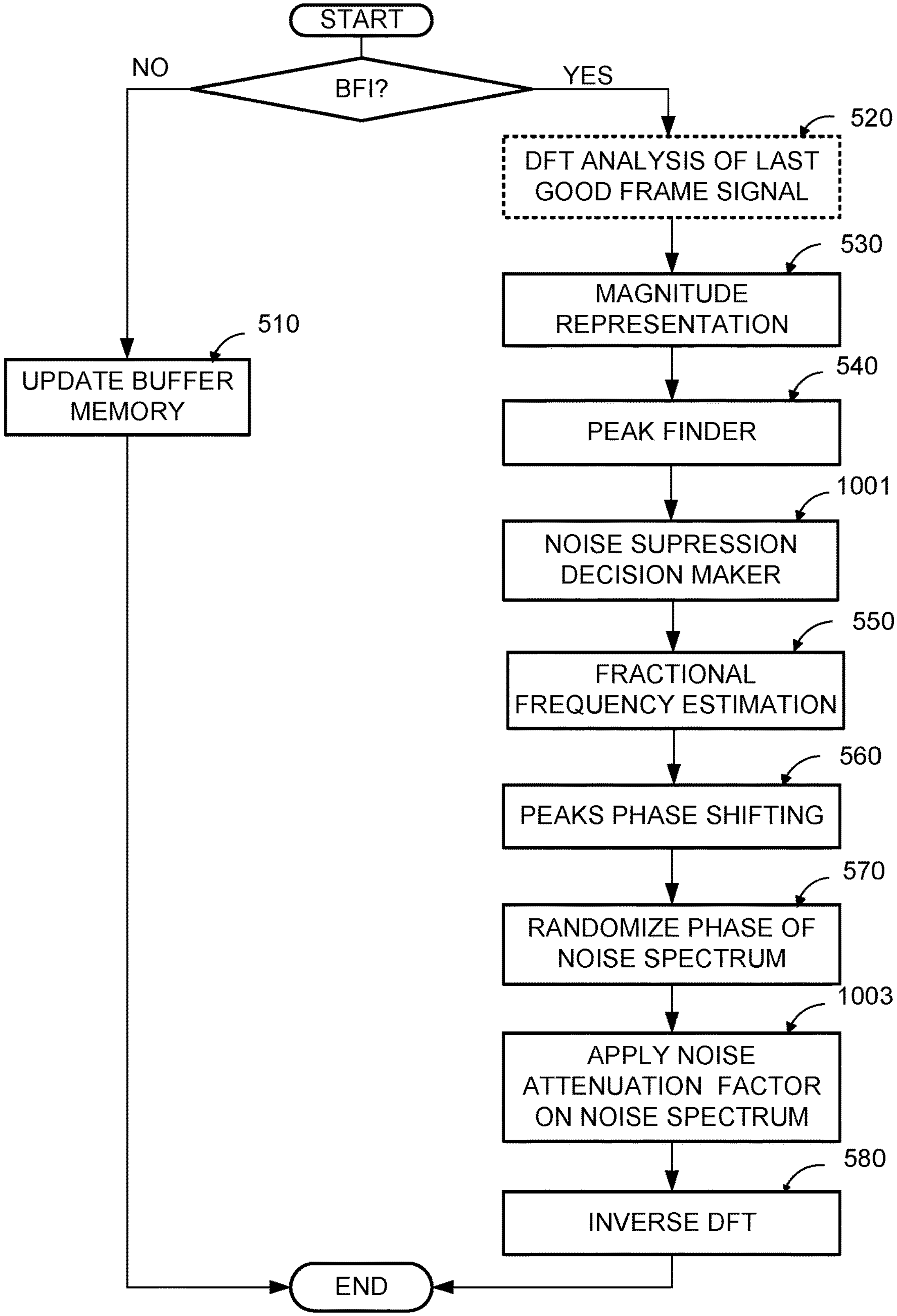

FIG. 11 illustrates how the inventive concepts of the noise attenuation can be integrated with the phase ECU flow diagram of FIG. 5. The noise suppression decision maker block 1001 determines whether or not the noise suppression attenuation should be applied. While the noise suppression decision maker block 1001 is shown between the peak finder block 540 and the fractional decision estimation block 550, the noise suppression block 1001 may be performed in other places of the phase ECU flow diagram. The application of the noise attenuation factor on the noise spectrum block 1003 may be applied after the phase randomization of noise spectrum block 570, but it may also be applied before the phase randomization.

Figure 12:
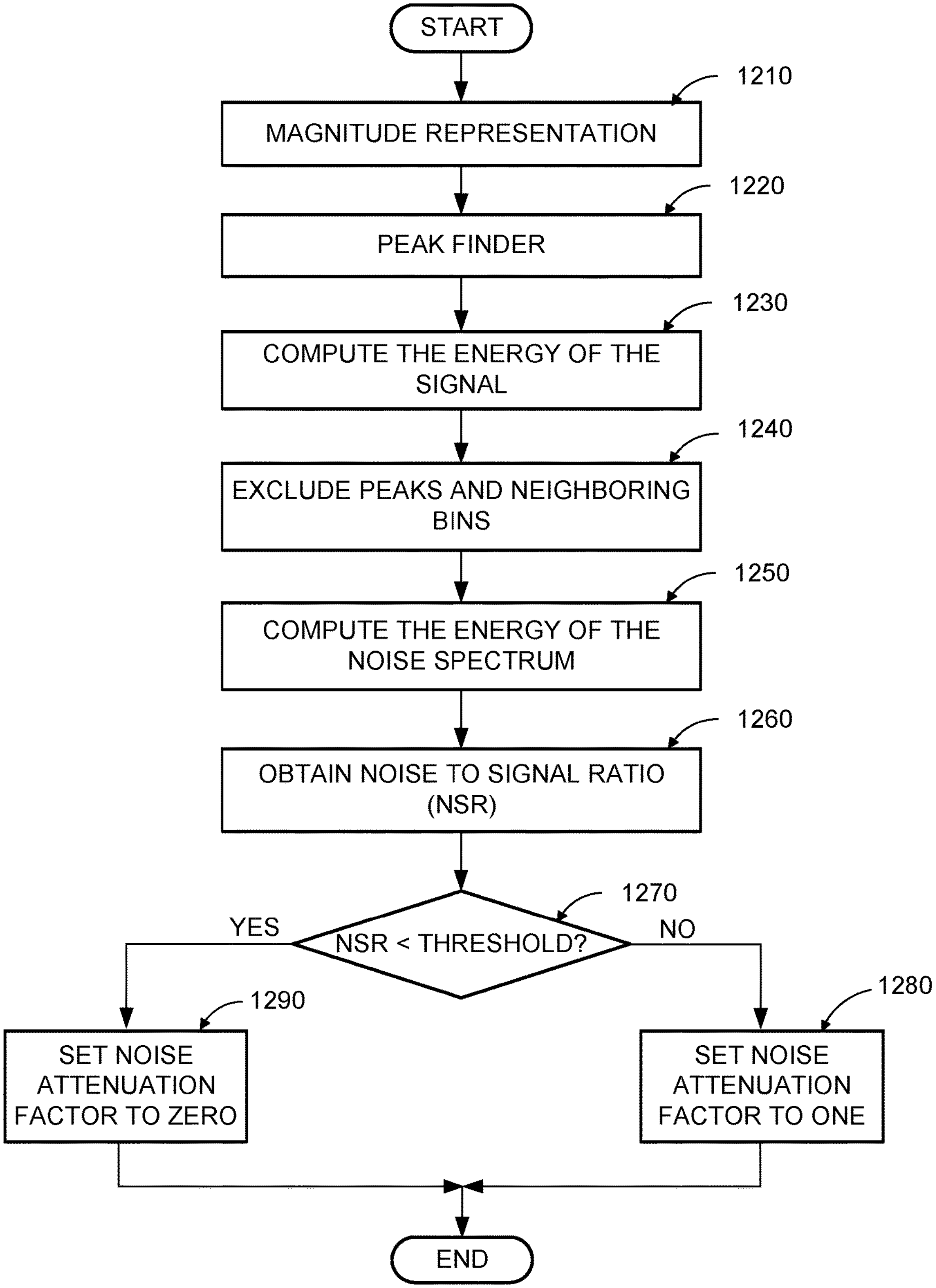

FIG. 12 illustrates the operations performed to reach the noise suppression decision. In block 1210, the processing circuitry 801 determines the magnitude representation of X(k). This may be determined in accordance with $$|X(k)|=\sqrt{\mathrm{Re}\{X(k)\}^2+\mathrm{Im}\{X(k)\}^2}$$

where Re{X(k)} and Im{X(k)} represent the real part and the imaginary part of X(k) respectively.

In block 1220, the processing circuitry 801 inputs the magnitude representation into a peak finder algorithm such as the peak finder algorithm described above.

In block 1230, the processing circuitry 801 computes the energy of the signal (e.g., the complete spectrum) including the peaks and neighboring bins of the peaks. In block 1240, the processing circuitry 801 excludes the peaks and neighboring bins of the peaks to determine the noise spectrum. In block 1250, the processing circuitry 801 computes the energy of the noise spectrum. The computation may be performed as illustrated in block 911.

In block 1260, the processing circuitry 801 obtains the noise to signal ratio (NSR). For example, as described in block 911, the noise-to-signal ratio (NSR) may be determined in accordance with:

$$NSR = \frac{E_{X_{noise}}}{E_X}$$

$$E_X = \sum_{k=0}^{N-1} |X(k)|^2$$

$$E_{X_{noise}} = \sum_{k \notin G(i)} |X(k)|^2$$

where $E_X$ is the energy of the complete spectrum, $E_{X_{noise}}$ is the energy of the noise spectrum, N is a number of samples, and G(i) is the set of bins of the peaks and neighboring bins.

In block 1270, the processing circuitry 801 determines whether or not the NSR is below a threshold level. For example, the threshold may be 0.175, or preferably 0.03, in some embodiments of inventive concepts or in the range (0,0.5] in other embodiments of inventive concepts as described above.

In block 1280, the processing circuitry 801, responsive to the NSR not being below the threshold (i.e., the NSR is above the threshold), sets the noise attenuation factor to 1. In block 1290, the processing circuitry 801, responsive to the NSR being below the threshold, sets the noise attenuation fact to zero.

Figure 13:
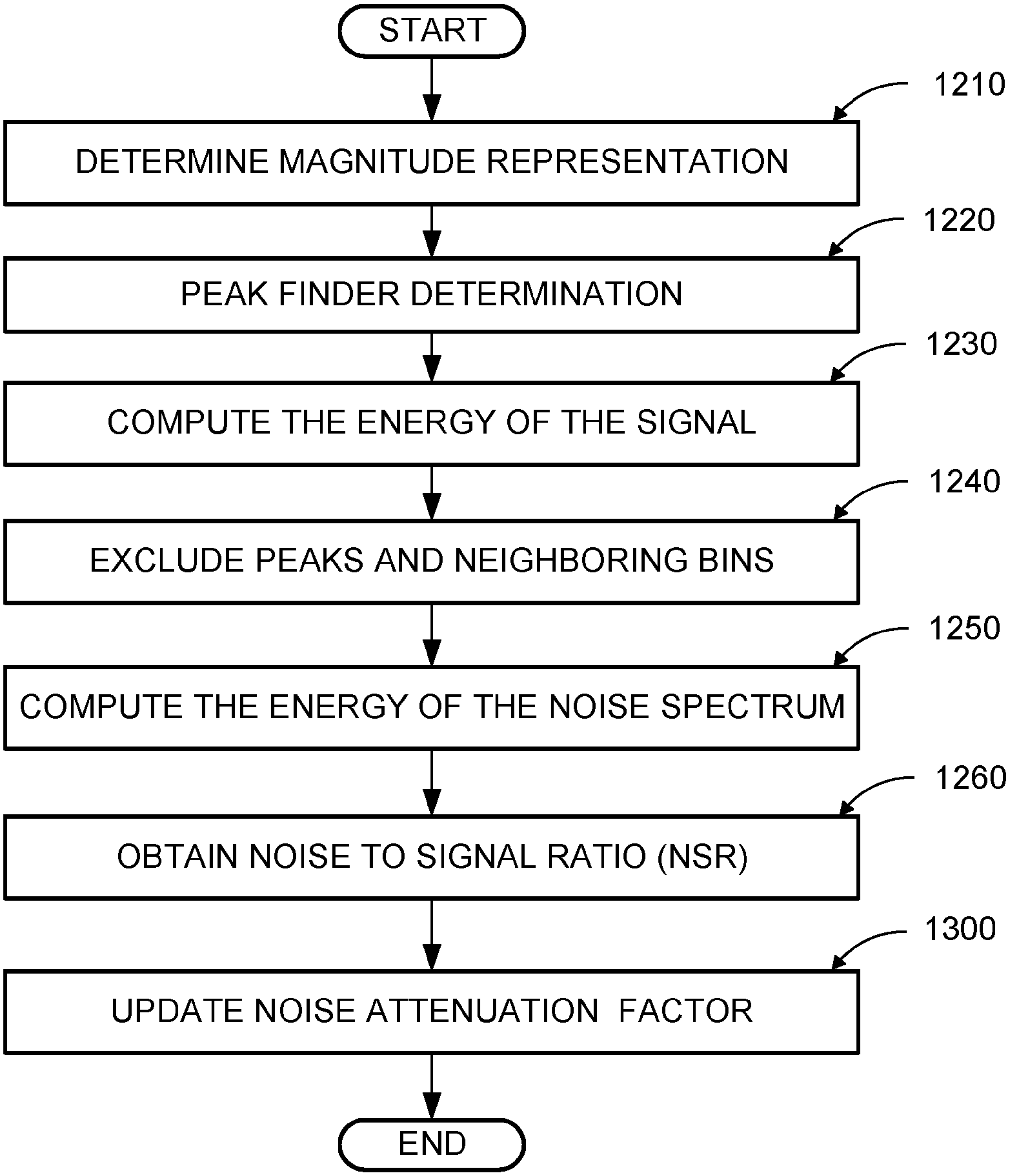

FIG. 13 illustrates a further embodiment of the noise suppression decision maker. Blocks 1210 to 1260 are performed as described in FIG. 12. In block 1300, the processing circuitry 801 updates the noise attenuation factor. For example, if the NSR is above a threshold ratio, the noise attenuation factor is updated to indicate the noise attenuation is to be applied. If the NSR is below the threshold ration, the noise attenuation factor is updated to indicate the noise attenuation is not to be applied.

Figure 14A:
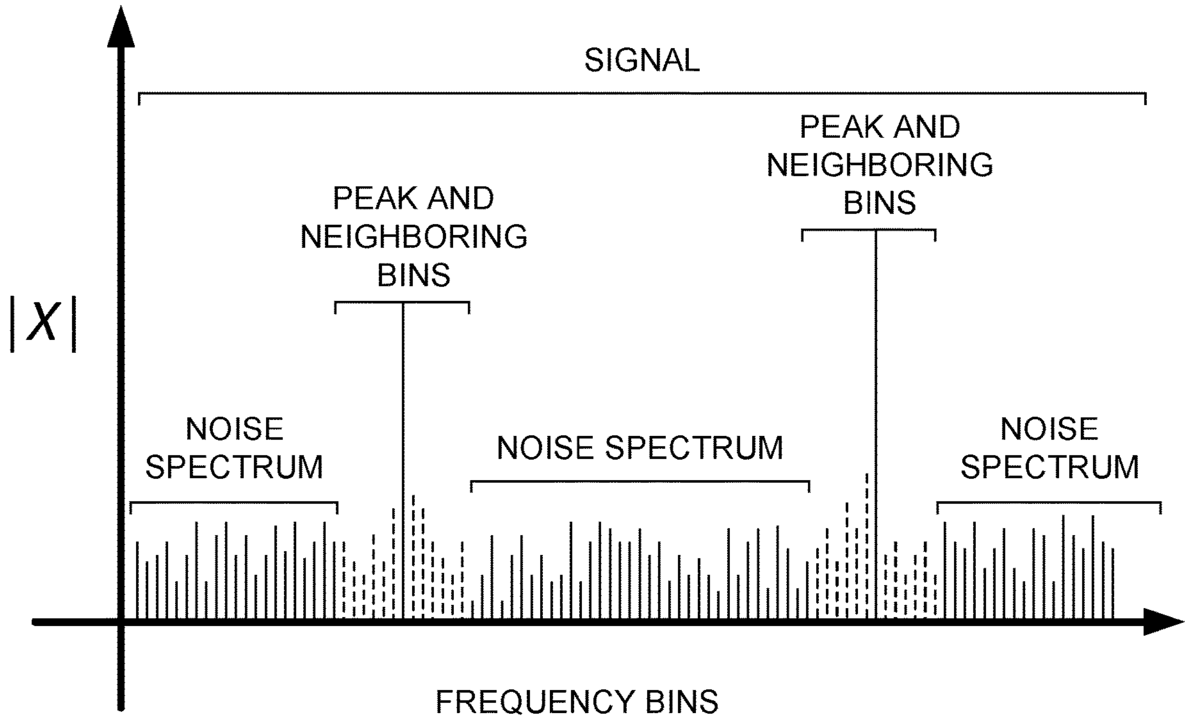
FIGS. 14A and 14B are illustrations of bins included in noise and signal energy ratio according to some embodiments of inventive concepts.
Figure 14B:
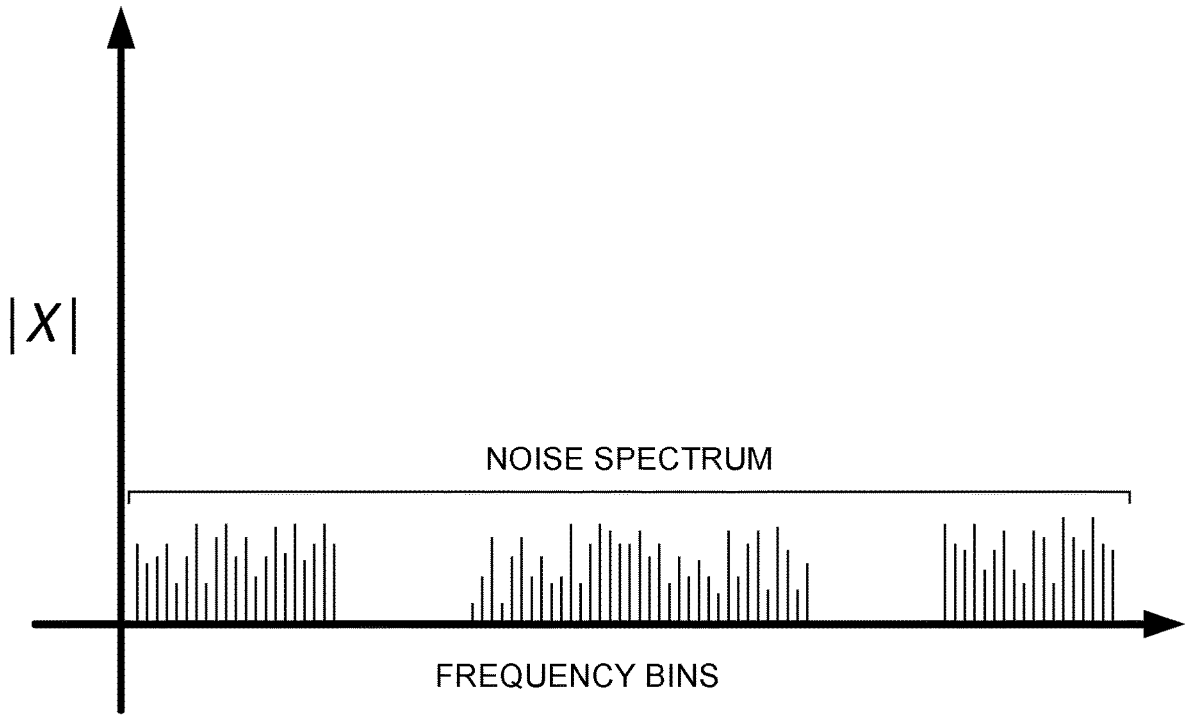

FIGS. 14A and 14B illustrate examples of the bins used in determining the energy of the signal and energy of the noise spectrum. In FIG. 14A, the bins of the peak and neighboring bins of the peak bins are illustrated as peak and neighboring bins and the noise bins are indicated as noise spectrum. In FIG. 14B, the peaks and neighboring bins of the peaks are excluded to determine the noise spectrum.

It should be noted that the above description applies to the first lost frame after a correctly received frame has been decoded. In severe channel conditions, several consecutive frames may be lost, which is also known as burst errors. In such cases, the method of the Phase ECU is to continue to reconstruct frames based on the same spectral analysis as in the first lost frame, only continuing the phase adjustment for the extended concealment period. The result of the analysis performed in the first lost frame, including peak analysis and noise floor attenuation, may preferably be reused in the following lost frames.

Example embodiments are discussed below.

Embodiment 1. A method of generating concealment audio frame of an audio signal in a decoding device, the method comprising:

- performing (901) a frequency domain analysis of a sequence of previously decoded audio signal to obtain a frequency spectrum;
- identifying (903) tonal components in the frequency spectrum by identifying peaks in the spectrum;
- determining (905) a fractional frequency for each of the identified peaks;
- applying (907) a phase adjustment on each of the identified peaks by adjusting the phase of the peak and the neighboring bins;
- applying (909) a random phase adjustment to a noise spectrum which comprises spectral bins that do not belong to the peaks and their neighboring bins;
- estimating (911) a relative energy between the noise spectrum and the complete spectrum;
- determining (913) an attenuation of the noise spectrum based on the relative energy;
- applying (915) the attenuation to the noise spectrum; and
- applying (917) an inverse transform to time domain on an error concealment spectrum, which is comprised of the peaks and the attenuated noise spectrum, and inserting the time domain concealment frame into the sequence of decoded audio samples.

Embodiment 2. The method of Embodiment 1, wherein determining (913) the attenuation of the noise spectrum comprises setting the noise spectrum to zero if the relative energy is below a threshold using an attenuation factor according to.

$$a_{noise} = \begin{cases} 0, & NSR < NSR_{thr} \\ 1, & NSR \geq NSR_{thr} \end{cases}$$

and applying the factor to the noise spectrum according to $$X_{noise,att}(k)=a_{noise}\cdot X_{noise}(k)$$

Embodiment 3. The method of embodiment 1, wherein determining (913) the attenuation of the noise spectrum comprises setting an attenuation factor according to $$a_{noise}=\begin{cases}1, & NSR_{hi}<NSR\\ \frac{(NSR-NSR_{lo})}{NSR_{hi}-NSR_{lo}}, & NSR_{lo}\le NSR\le NSR_{hi}\\ 0, & NSR<NSR_{lo}\end{cases}$$

and applying the factor to the noise spectrum according to $$X_{noise,att}(k)=a_{noise}\cdot X_{noise}(k)$$

Embodiment 4. The method of Embodiment 1, wherein determining (913) the attenuation of the noise spectrum comprises:

setting an attenuation factor according to $$a_{noise}=\min(1,c\cdot \mathrm{NSR})$$

and applying the factor to the noise spectrum according to $$X_{noise,att}(k)=a_{noise}\cdot X_{noise}(k)$$

Embodiment 5. The method of any of embodiments 1-3 wherein the time domain concealment frame is adapted using a time domain aliasing operation to fit into a Modulated Lapped Transform (MLT) based decoder.

Embodiment 6. A decoder (602) for generating concealment audio frame of an audio signal in a decoding device, the decoder (602) comprising:

processing circuitry (801); and memory (803) coupled with the processing circuitry, wherein the memory includes instructions that when executed by the processing circuitry causes the decoder (602) to perform operations comprising:

performing (901) a frequency domain analysis of a sequence of previously decoded audio signal to obtain a frequency spectrum;

identifying (903) tonal components in the frequency spectrum by identifying peaks in the spectrum;

determining (905) a fractional frequency for each of the identified peaks;

applying (907) a phase adjustment on each of the identified peaks by adjusting the phase of the peak and the neighboring bins;

applying (909) a random phase adjustment to a noise spectrum which comprises spectral bins that do not belong to the peaks and their neighboring bins;

estimating (911) a relative energy between the noise spectrum and the complete spectrum;

deciding (913) an attenuation of the noise spectrum based on the relative energy;

applying (915) the attenuation to the noise spectrum; and applying (917) an inverse transform to time domain on an error concealment spectrum, which is comprised of the peaks and the attenuated noise spectrum, and inserting the time domain concealment frame into the sequence of decoded audio samples.

Embodiment 7. The decoder (602) of Embodiment 6, wherein in determining (913) the attenuation of the noise spectrum, the memory includes instructions that when executed by the processing circuitry causes the decoder (602) to perform operations comprising setting the noise spectrum to zero if the relative energy is below a threshold using an attenuation factor according to.

$$a_{noise}=\begin{cases}0, & NSR<NSR_{thr}\\ 1, & NSR\ge NSR_{thr}\end{cases}$$

and applying the factor to the noise spectrum according to $$X_{noise,att}(k)=a_{noise}\cdot X_{noise}(k)$$

Embodiment 8. The decoder (602) of Embodiment 6, wherein in determining (913) the attenuation of the noise spectrum, the memory includes instructions that when executed by the processing circuitry causes the decoder (602) to perform operations comprising setting an attenuation factor according to $$a_{noise}=\begin{cases}1, & NSR_{hi}<NSR\\ \frac{(NSR-NSR_{lo})}{NSR_{hi}-NSR_{lo}}, & NSR_{lo}\le NSR\le NSR_{hi}\\ 0, & NSR<NSR_{lo}\end{cases}$$

and applying the factor to the noise spectrum according to $$X_{noise,att}(k)=a_{noise}\cdot X_{noise}(k)$$

Embodiment 9. The decoder (602) of Embodiment 6, wherein in determining (913) the attenuation of the noise spectrum, the memory includes instructions that when executed by the processing circuitry causes the decoder (602) to perform operations comprising:

setting an attenuation factor according to $$a_{noise}=\min(1,c\cdot \mathrm{NSR})$$

and applying the factor to the noise spectrum according to $$X_{noise,att}(k)=a_{noise}\cdot X_{noise}(k)$$

Embodiment 10. The decoder (602) of any of Embodiments 6-9 wherein the time domain concealment frame is adapted using a time domain aliasing operation to fit into a Modulated Lapped Transform (MLT) based decoder.

Embodiment 11. A decoder (602) adapted to perform operations comprising:

performing (901) a frequency domain analysis of a sequence of previously decoded audio signal to obtain a frequency spectrum;

identifying (903) tonal components in the frequency spectrum by identifying peaks in the spectrum;

determining (905) a fractional frequency for each of the identified peaks;

applying (907) a phase adjustment on each of the identified peaks by adjusting the phase of the peak and the neighboring bins;

applying (909) a random phase adjustment to a noise spectrum which comprises spectral bins that do not belong to the peaks and their neighboring bins;

estimating (911) a relative energy between the noise spectrum and the complete spectrum;

determining (913) an attenuation of the noise spectrum based on the relative energy;

applying (915) the attenuation to the noise spectrum; and applying (917) an inverse transform to time domain on an error concealment spectrum, which is comprised of the peaks and the attenuated noise spectrum, and inserting the time domain concealment frame into the sequence of decoded audio samples.

Embodiment 12. The decoder (602) of Embodiment 11, wherein the decoder (602) is further adapted to perform operations according to any of Embodiments 2-5.

Embodiment 13. A computer program comprising program code to be executed by processing circuitry (801) of a decoder (602), whereby execution of the program code causes the decoder (602) to perform operations comprising:

performing (901) a frequency domain analysis of a sequence of previously decoded audio signal to obtain a frequency spectrum;

identifying (903) tonal components in the frequency spectrum by identifying peaks in the spectrum;

determining (905) a fractional frequency for each of the identified peaks;

applying (907) a phase adjustment on each of the identified peaks by adjusting the phase of the peak and the neighboring bins;

applying (909) a random phase adjustment to a noise spectrum which comprises spectral bins that do not belong to the peaks and their neighboring bins;

estimating (911) a relative energy between the noise spectrum and the complete spectrum;

determining (913) an attenuation of the noise spectrum based on the relative energy;

applying (915) the attenuation to the noise spectrum; and applying (917) an inverse transform to time domain on an error concealment spectrum, which is comprised of the peaks and the attenuated noise spectrum, and inserting the time domain concealment frame into the sequence of decoded audio samples.

Embodiment 14. The computer program according to Embodiment 12 comprising further program code, whereby execution of the further program code causes the decoder (602) to perform operations according to any of Embodiments 2-5.

Embodiment 15. A computer program product comprising a non-transitory storage medium including program code to be executed by processing circuitry (801) of a decoder (602), whereby execution of the program code causes the decoder (602) to perform operations comprising:

performing (901) a frequency domain analysis of a sequence of previously decoded audio signal to obtain a frequency spectrum;

identifying (903) tonal components in the frequency spectrum by identifying peaks in the spectrum;

determining (905) a fractional frequency for each of the identified peaks;

applying (907) a phase adjustment on each of the identified peaks by adjusting the phase of the peak and the neighboring bins;

applying (909) a random phase adjustment to a noise spectrum which comprises spectral bins that do not belong to the peaks and their neighboring bins;

estimating (911) a relative energy between the noise spectrum and the complete spectrum;

determining (913) an attenuation of the noise spectrum based on the relative energy;

applying (915) the attenuation to the noise spectrum; and applying (917) an inverse transform to time domain on an error concealment spectrum, which is comprised of the peaks and the attenuated noise spectrum, and inserting the time domain concealment frame into the sequence of decoded audio samples.

Embodiment 16. The computer program product of Embodiment 15, wherein the non-transitory storage medium includes further program code to be executed by processing circuitry (801) of the decoder (602), whereby execution of the further program code causes the decoder (602) to perform operations according to any of Embodiments 2-5.

Explanations are provided below for various abbreviations/acronyms used in the present disclosure.

| Abbreviation | Explanation |
|---|---|
| ADC | Analog to Digital Converter |
| BFI | Bad Frame Indicator |
| DAC | Digital to Analog Converter |

-continued

| Abbreviation | Explanation |
|---|---|
| DFT | Discrete Fourier Transform |
| MDCT | Modified Discrete Cosine Transform |
| MLT | Modulated Lapped Transform |
| TDA | Time Domain Aliasing |
| PLC | Packet Loss Concealment |
| ECU | Error Concealment Unit |
| NSR | Noise-to-Signal Ratio |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
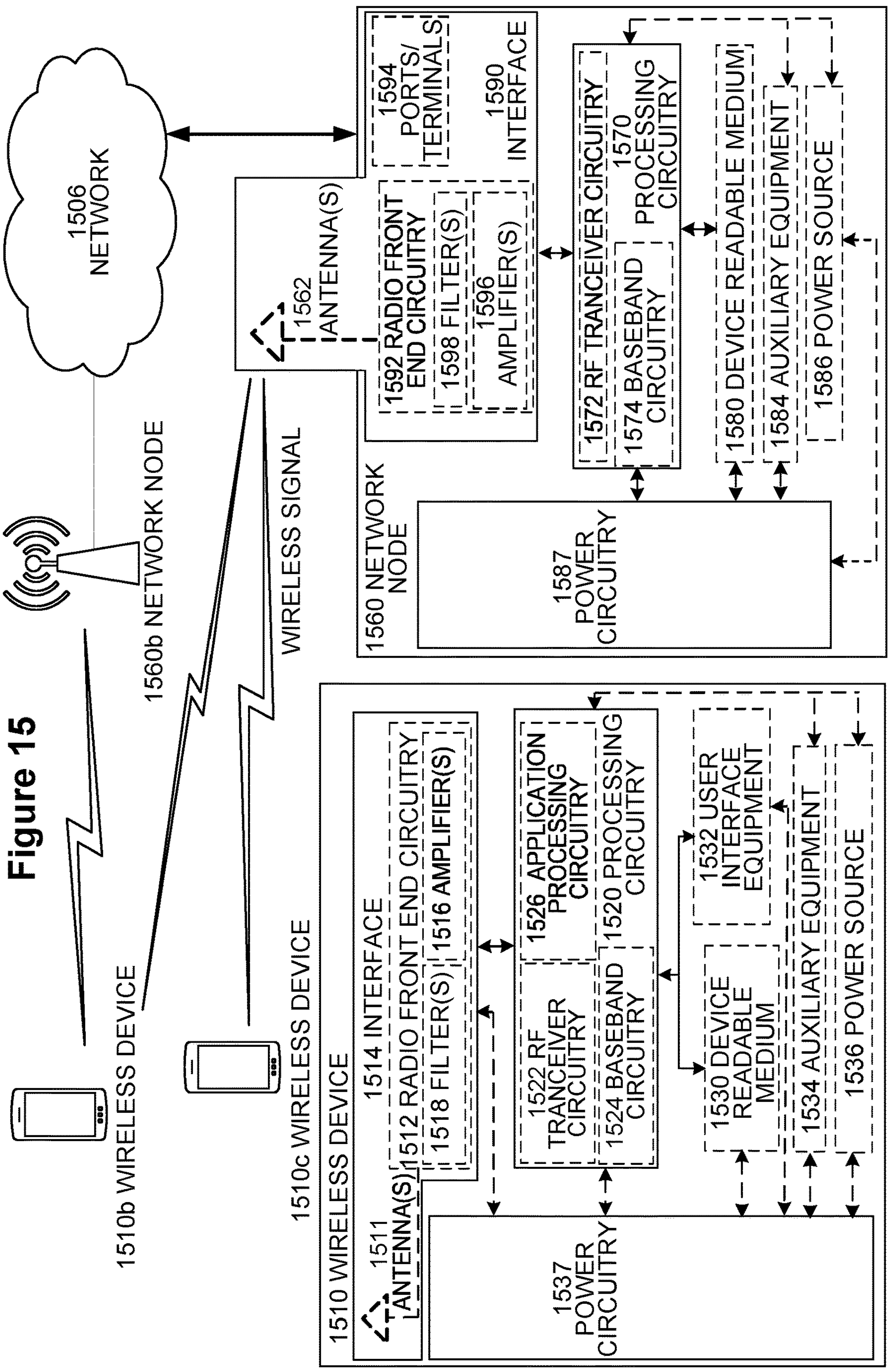
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are can be implemented in a wireless network, such as the example wireless network illustrated in FIG. 15. For simplicity, the wireless network of FIG. 15 only depicts network 1506, network nodes 1560 and 1560*b*, and wireless devices (WDs) 1510, 1510*b*, and 1510*c* (also referred to as mobile terminals). In various embodiments, the decoder 602 and encoder 600 may be implemented in network nodes 1560 and 1560*b* and/or WDs 1510, 1510*b*, and 1510*c*. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein including the encoder 600 and/or decoder 602. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1592 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node

1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1512 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
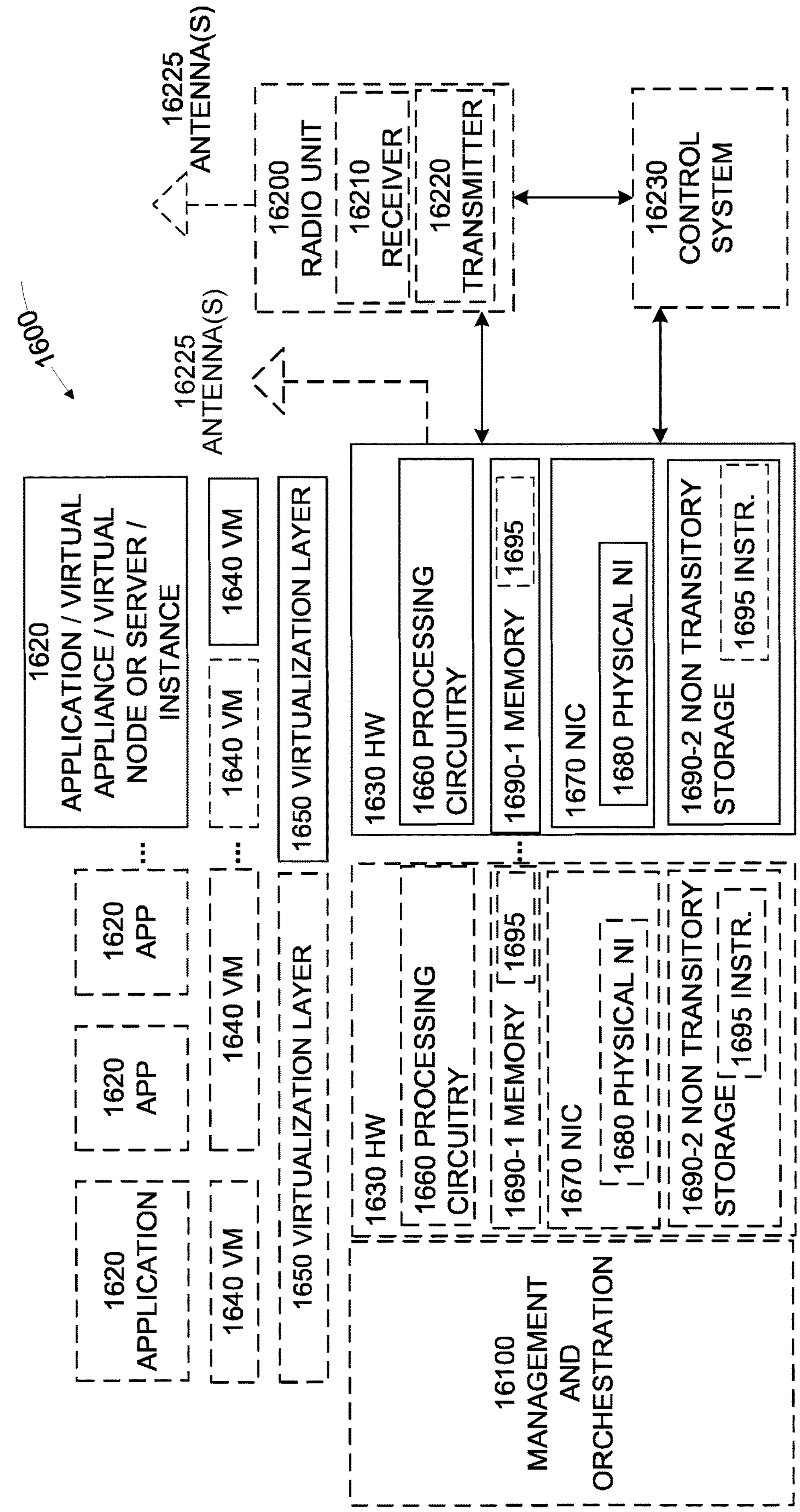
FIG. 16 is a block diagram of a virtualization environment in accordance with some embodiments.

FIG. 16 illustrates a virtualization environment in accordance with some embodiments. FIG. 16 is a schematic block diagram illustrating a virtualization environment 1600 in which functions implemented by some embodiments of encoders 600 and/or decoders 602 may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640 comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment. In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of generating concealment audio frame of an audio signal in a decoding device, the method comprising:
- performing a frequency domain analysis of a sequence of previously decoded audio signal to obtain a frequency spectrum;
- identifying tonal components in the frequency spectrum by identifying peaks in the frequency spectrum;
- applying a phase adjustment on the identified peaks by adjusting the phase of the peak and neighboring bins;
- applying a random phase adjustment to a noise spectrum which comprises spectral bins that do not belong to the identified peaks and their neighboring bins;
- estimating a relative energy between the noise spectrum and the frequency spectrum;
- determining an attenuation of the noise spectrum based on the relative energy;
- applying the attenuation to the noise spectrum; and
- applying an inverse transform to time domain on an error concealment spectrum, which is comprised of the phase adjusted peaks and the attenuated noise spectrum.

2. The method of claim 1, wherein determining the attenuation of the noise spectrum comprises setting a noise attenuation factor, $a_{noise}$, to a first value if the relative energy is below a threshold and otherwise setting the noise attenuation factor to a second value.

3. The method of claim 2, wherein the noise attenuation factor is in the range $a_{noise} \in [0,1]$.

4. The method of claim 2, wherein applying the attenuation to the noise spectrum comprises applying the noise attenuation factor, $a_{noise}$, to the noise spectrum, $X_{noise}(k)$, according to $$X_{noise,att}(k)=a_{noise} \cdot X_{noise}(k).$$

5. The method of claim 1, wherein determining the attenuation of the noise spectrum comprises forming a noise attenuation factor by performing a linear mapping of the relative energy to the noise attenuation factor using a piece-wise linear function.

6. The method of claim 5, wherein the noise attenuation factor is formed according to $$a_{noise} = \begin{cases} 1, & NSR_{hi} < NSR \\ \dfrac{(NSR - NSR_{lo})}{NSR_{hi} - NSR_{lo}}, & NSR_{lo} \le NSR \le NSR_{hi} \\ 0, & NSR < NSR_{lo} \end{cases}$$

where NSR is the relative energy, $NSR_{hi}$ is a first threshold and $NSR_{lo}$ is a second threshold lower than the first threshold.

7. The method of claim 1, wherein determining the attenuation of the noise spectrum comprises setting a noise attenuation factor according to $$a_{noise}=\min(1,c \cdot \mathrm{NSR}),$$

where c is a constant in the range $c \in (0,1]$ and NSR is the relative energy.

8. A decoder for generating concealment audio frame of an audio signal in a decoding device, the decoder comprising:
- processing circuitry; and
- memory coupled with the processing circuitry, wherein the memory includes instructions that when executed by the processing circuitry causes the decoder to perform operations comprising:
  - performing a frequency domain analysis of a sequence of previously decoded audio signal to obtain a frequency spectrum;
  - identifying tonal components in the frequency spectrum by identifying peaks in the frequency spectrum;
  - applying a phase adjustment on the identified peaks by adjusting the phase of the peak and neighboring bins;
  - applying a random phase adjustment to a noise spectrum which comprises spectral bins that do not belong to the identified peaks and their neighboring bins;
  - estimating a relative energy between the noise spectrum and the frequency spectrum;
  - determining an attenuation of the noise spectrum based on the relative energy;
  - applying the attenuation to the noise spectrum; and
  - applying an inverse transform to time domain on an error concealment spectrum, which is comprised of the phase adjusted peaks and the attenuated noise spectrum.

9. The decoder of claim 8, wherein in determining the attenuation of the noise spectrum, the memory includes instructions that when executed by the processing circuitry causes the decoder to perform operations comprising setting a noise attenuation factor, $a_{noise}$, to a first value if the relative energy is below a threshold and otherwise setting the noise attenuation factor to a second value.

10. The decoder of claim 9, wherein the noise attenuation factor is in the range $a_{noise} \in [0,1]$.

11. The decoder of claim 9, wherein applying the attenuation to the noise spectrum, the memory includes instructions that when executed by the processing circuitry causes the decoder to perform operations comprising:
- applying the noise attenuation factor, $a_{noise}$, to the noise spectrum, $X_{noise}(k)$, according to $$X_{noise,att}(k)=a_{noise} \cdot X_{noise}(k).$$

12. The decoder of claim 8, wherein in determining the attenuation of the noise spectrum, the memory includes instructions that when executed by the processing circuitry causes the decoder to perform operations comprising forming a noise attenuation factor by performing a linear mapping of the relative energy to the noise attenuation factor using a piece-wise linear function.

13. The decoder of claim 12, wherein the noise attenuation factor is formed according to $$a_{noise} = \begin{cases} 1, & NSR_{hi} < NSR \\ \dfrac{(NSR - NSR_{lo})}{NSR_{hi} - NSR_{lo}}, & NSR_{lo} \le NSR \le NSR_{hi} \\ 0, & NSR < NSR_{lo} \end{cases}$$

where NSR is the relative energy, $NSR_{hi}$ is a first threshold and $NSR_{lo}$ is a second threshold lower than the first threshold.

14. The decoder of claim 8, wherein in determining the attenuation of the noise spectrum, the memory includes instructions that when executed by the processing circuitry causes the decoder to perform operations comprising:

setting a noise attenuation factor according to $$a_{noise}=\min(1,c\cdot\text{NSR})$$

where c is a constant in the range c∈(0,1] and NSR is the relative energy.

15. A computer program product comprising a non-transitory storage medium including program code to be executed by processing circuitry of a decoder, whereby execution of the program code causes the decoder to perform operations comprising:

performing a frequency domain analysis of a sequence of previously decoded audio signal to obtain a frequency spectrum;

identifying tonal components in the frequency spectrum by identifying peaks in the frequency spectrum;

applying a phase adjustment on the identified peaks by adjusting the phase of the peak and neighboring bins;

applying a random phase adjustment to a noise spectrum which comprises spectral bins that do not belong to the identified peaks and their neighboring bins;

estimating a relative energy between the noise spectrum and the frequency spectrum;

determining an attenuation of the noise spectrum based on the relative energy;

applying the attenuation to the noise spectrum; and applying an inverse transform to time domain on an error concealment spectrum, which is comprised of the phase adjusted peaks and the attenuated noise spectrum.

16. The computer program product of claim 15, wherein the non-transitory storage medium includes further program code to be executed by processing circuitry of the decoder, whereby execution of the further program code causes the decoder to perform operations of setting a noise attenuation factor, $a_{noise}$, to a first value if the relative energy is below a threshold and otherwise setting the noise attenuation factor to a second value.

* * * * *